US012747565B2

(12) United States Patent
Kawate

(10) Patent No.: US 12,747,565 B2
(45) Date of Patent: Sep. 29, 2026

(54) SYSTEM AND PROGRAM

(71) Applicant: Sony Semiconductor Solutions Corporation, Atsugi (JP)

(72) Inventor: Hayami Kawate, Atsugi (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 0 days.

(21) Appl. No.: 18/872,283

(22) PCT Filed: Jun. 23, 2023

(86) PCT No.: PCT/JP2023/023283
§ 371 (c)(1),
(2) Date: Dec. 6, 2024

(87) PCT Pub. No.: WO2024/009803
PCT Pub. Date: Jan. 11, 2024

(65) Prior Publication Data
US 2025/0361698 A1 Nov. 27, 2025

(30) Foreign Application Priority Data
Jul. 4, 2022 (JP) ................................ 2022-107769

(51) Int. Cl.
*G05D 1/622* (2024.01)
*E02F 9/26* (2006.01)
(Continued)

(52) U.S. Cl.
CPC ............. *E02F 9/264* (2013.01); *G05D 1/622* (2024.01); *G06T 7/60* (2013.01); *G05D 2105/05* (2024.01); *G05D 2111/10* (2024.01)

(58) Field of Classification Search
CPC .......... E02F 9/264; E02F 9/261; G05D 1/622; G05D 2105/05; G05D 2111/10; G06T 7/60; G06T 7/00; G06T 7/11
See application file for complete search history.

(56) References Cited

U.S. PATENT DOCUMENTS 3,716,833 A * 2/1973 Roth ........................ G01S 17/88 340/904
4,954,962 A * 9/1990 Evans, Jr. ............ G05D 1/0246 701/28
(Continued)

FOREIGN PATENT DOCUMENTS

CN 106436544 A * 2/2017 ........... B62D 55/116
CN 111928782 A * 11/2020 ............. B66C 13/46
(Continued)

OTHER PUBLICATIONS

"Lidar based off-road negative obstacle detection and analysis;" Larson, 2011 14th International IEEE Conference on Intelligent Transportation Systems (ITSC) (2011, pp. 192-197); Dec. 20, 2011. (Year: 2011).*
(Continued)

*Primary Examiner* — Khoi H Tran
*Assistant Examiner* — Jorge O Peche
(74) *Attorney, Agent, or Firm* — XSENSUS LLP

(57) ABSTRACT

A system detects a traveling obstacle region that is a region that obstructs traveling of a work machine. The system includes a region angle detector, a region height detector, an angle obstacle region detector, a height obstacle region detector, and a traveling obstacle region detector. The region angle detector detects an angle of a traveling surface based on a distance image around the work machine. The region height detector detects height of the traveling surface based on the distance image. The angle obstacle region detector detects an angle obstacle region that is an obstacle region based on the detected angle. The height obstacle region detector detects a height obstacle region that is an obstacle region based on the detected height. The traveling obstacle region detector detects a traveling obstacle region based on
(Continued)

the detected angle obstacle region and the detected height obstacle region.

8 Claims, 12 Drawing Sheets

(51) Int. Cl.

| | |
|---|---|
| ***G06T 7/60*** | (2017.01) |
| *G05D 105/05* | (2024.01) |
| *G05D 111/10* | (2024.01) |

(56) References Cited

U.S. PATENT DOCUMENTS

| | | | | |
|---|---|---|---|---|
| 5,040,116 | A * | 8/1991 | Evans, Jr. | G05D 1/0246 701/28 |
| 5,555,018 | A * | 9/1996 | von Braun | G01C 11/025 348/E7.086 |
| 5,587,929 | A * | 12/1996 | League | G01S 13/931 342/159 |
| 6,055,042 | A * | 4/2000 | Sarangapani | G01S 13/931 901/46 |
| 6,268,803 | B1 * | 7/2001 | Gunderson | G08G 1/166 340/436 |
| 8,170,787 | B2 * | 5/2012 | Coats | G01S 13/867 342/70 |
| 8,280,621 | B2 * | 10/2012 | Edwards | G01S 13/931 342/70 |
| 8,688,332 | B2 * | 4/2014 | Reiners | E02F 9/2054 701/50 |
| 9,291,709 | B2 * | 3/2016 | Mitsuta | G06T 1/0007 |
| 9,928,648 | B2 * | 3/2018 | Ambrus | G02B 27/0172 |
| 10,037,613 | B1 * | 7/2018 | Becker | G06T 7/277 |
| 10,613,218 | B2 * | 4/2020 | Ichinose | G08G 1/168 |
| 10,909,411 | B2 * | 2/2021 | Sano | G01C 21/3602 |
| 10,976,438 | B2 * | 4/2021 | Tasaki | G01S 7/4808 |
| 11,037,320 | B1 * | 6/2021 | Ebrahimi Afrouzi | G01C 3/085 |
| 11,348,269 | B1 * | 5/2022 | Ebrahimi Afrouzi | G01S 17/48 |
| 11,530,119 | B2 * | 12/2022 | Kosaka | B66C 13/46 |
| 2001/0018640 | A1 * | 8/2001 | Matsunaga | G05D 1/0274 382/168 |
| 2002/0075180 | A1 * | 6/2002 | Sakai | G01S 15/931 342/52 |
| 2005/0073433 | A1 * | 4/2005 | Gunderson | G01S 13/931 340/903 |
| 2008/0071475 | A1 * | 3/2008 | Takaoka | G01C 21/20 701/469 |
| 2008/0266167 | A1 * | 10/2008 | Baumann | G01S 17/87 342/52 |
| 2010/0076708 | A1 * | 3/2010 | Hukkeri | G01S 7/52004 702/94 |
| 2012/0271504 | A1 * | 10/2012 | Reiners | E02F 9/2054 701/439 |
| 2013/0282224 | A1 * | 10/2013 | Yazaki | A01D 34/008 701/24 |
| 2014/0012453 | A1 * | 1/2014 | Johnson | G05D 1/0265 701/23 |
| 2017/0225336 | A1 * | 8/2017 | Deyle | B25J 11/008 |
| 2017/0229019 | A1 * | 8/2017 | Ichinose | G08G 1/166 |
| 2017/0277197 | A1 * | 9/2017 | Liao | G06V 10/757 |
| 2017/0332871 | A1 * | 11/2017 | Sung | G01S 17/46 |
| 2018/0084708 | A1 * | 3/2018 | Neitemeier | A01B 69/001 |
| 2019/0012798 | A1 * | 1/2019 | Amano | G06T 7/11 |
| 2019/0120633 | A1 * | 4/2019 | Afrouzi | A47L 11/4011 |
| 2019/0241408 | A1 * | 8/2019 | Strahl | B66C 13/46 |
| 2020/0338733 | A1 * | 10/2020 | Dupuis | G05D 1/6987 |
| 2020/0375095 | A1 * | 12/2020 | Koto | A01B 69/00 |
| 2021/0163270 | A1 * | 6/2021 | Kosaka | B66C 13/46 |
| 2021/0197712 | A1 * | 7/2021 | Korjus | G05D 1/224 |
| 2022/0066456 | A1 * | 3/2022 | Ebrahimi Afrouzi | G06F 3/04883 |
| 2022/0175210 | A1 * | 6/2022 | Choi | G01B 11/254 |
| 2022/0374639 | A1 * | 11/2022 | Nakagawa | G06V 20/586 |
| 2023/0009071 | A1 * | 1/2023 | Zhu | G01S 7/4815 |
| 2023/0017850 | A1 * | 1/2023 | Thorson | G05D 1/0255 |
| 2025/0013245 | A1 * | 1/2025 | Nishibeppu | G05D 1/648 |
| 2025/0067875 | A1 * | 2/2025 | Sawahashi | G05D 1/2435 |
| 2025/0306201 | A1 * | 10/2025 | Honda | G01S 15/42 |
| 2025/0328147 | A1 * | 10/2025 | Cheng | A47L 11/20 |
| 2025/0361698 | A1 * | 11/2025 | Kawate | E02F 9/264 |
| 2026/0015833 | A1 * | 1/2026 | Dianics | E02F 9/24 |
| 2026/0015834 | A1 * | 1/2026 | Dianics | E02F 9/24 |
| 2026/0021998 | A1 * | 1/2026 | Ulbrich | B66F 9/063 |

FOREIGN PATENT DOCUMENTS

| | | | | |
|---|---|---|---|---|
| EP | 0358628 | A2 * | 3/1990 | G01S 17/931 |
| EP | 3190576 | A1 * | 7/2017 | G01S 13/931 |
| EP | 3808694 | A1 * | 4/2021 | G01B 11/02 |
| EP | 4560426 | A1 * | 5/2025 | G01C 21/1656 |
| EP | 4560426 | B1 * | 4/2026 | G05D 1/648 |
| JP | 09128043 | A * | 5/1997 | |
| JP | 2006-146376 | A | 6/2006 | |
| JP | 2015-219802 | A | 12/2015 | |
| JP | 2018-095365 | A | 6/2018 | |
| JP | 2018113937 | A * | 7/2018 | A01B 76/00 |
| JP | 6677513 | B2 * | 4/2020 | |
| JP | 2021077003 | A * | 5/2021 | |
| JP | 2023169512 | A * | 11/2023 | E02F 9/264 |
| KR | 20180123725 | A * | 11/2018 | B25J 9/162 |
| WO | WO-2023116914 | A1 * | 6/2023 | G05D 1/622 |

OTHER PUBLICATIONS

"Adaptive Obstacle Detection for Mobile Robots in Urban Environments Using Downward-Looking 2D LiDAR;" Pang et al., Sensors (Basel, Switzerland), 18(6), 1749; May 29, 2018. (Year: 2018).*

"Obstacle Detection and Height Estimation Using Fisheye Stereo Camera Considering Intensity Information," Chikugo et al., 2024 IEEE/SICE International Symposium on System Integration (SII) (2024, pp. 147-152); Jan. 8, 2024. (Year: 2024).*

JP 2021077003 A—Machine Translation (Year: 2021).*

International Search Report and Written Opinion mailed on Aug. 1, 2023, received for PCT Application PCT /JP2023/023283, filed on Jun. 23, 2023, 10 pages including English Translation.

* cited by examiner

SYSTEM AND PROGRAM

CROSS-REFERENCE TO RELATED APPLICATIONS

This application is a national stage application, pursuant to 35 U.S.C. § 371, of International Patent Application No. PCT/JP2023/023283, filed Jun. 23, 2023, which claims priority to Japanese Patent Application No. 2022-107769, filed Jul. 4, 2022, the entire contents of each are incorporated herein by reference.

FIELD

The present disclosure relates to a system and a program.

BACKGROUND

There has been proposed a system that prevents an accident such as falling when a work device such as an excavator travels at a construction site or the like. For example, there has been proposed a crane that generates a three-dimensional map by imaging a work site, recognizes a gradient angle of a road surface from the three-dimensional map, and compares the gradient angle with a hill climbing ability of a work device to thereby determine whether traveling is possible (see, for example, Patent Literature 1).

CITATION LIST

Patent Literature

Patent Literature 1: JP 2018-095365 A

SUMMARY

Technical Problem

However, in the related art explained above, since a dangerous region is determined based on whether the excavator of the system and the road surface come into contact, there is a problem in that an obstacle region cannot be sufficiently detected.

Therefore, the present disclosure proposes a system and a program for improving an ability of detecting an obstacle region.

Solution to Problem

A system according to the present disclosure is a system that detects a traveling obstacle region that is a region that obstructs traveling of a work machine, and includes a region angle detection unit, a region height detection unit, an angle obstacle region detection unit, a height obstacle region detection unit and a traveling obstacle region detection unit. The region angle detection unit detects an angle of a traveling surface based on a distance image around the work machine. The region height detection unit detects a height of the traveling surface based on the distance image. The angle obstacle region detection unit detects an angle obstacle region that is an obstacle region based on the detected angle. The height obstacle region detection unit detects a height obstacle region that is an obstacle region based on the detected height. The traveling obstacle region detection unit detects the traveling obstacle region based on the detected angle obstacle region and the detected height obstacle region.

A program according to the present disclosure is a program for detecting a traveling obstacle region that is a region that obstructs traveling of a work machine, and includes: a region angle detection procedure of detecting an angle of a traveling surface based on a distance image around the work machine; a region height detection procedure of detecting height of the traveling surface based on the distance image; an angle obstacle region detection procedure of detecting an angle obstacle region that is an obstacle region based on the detected angle; a height obstacle region detection procedure of detecting a height obstacle region that is an obstacle region based on the detected height; and a traveling obstacle region detection procedure of detecting the traveling obstacle region based on the detected angle obstacle region and the detected height obstacle region.

DESCRIPTION OF EMBODIMENTS

Figure 1A:
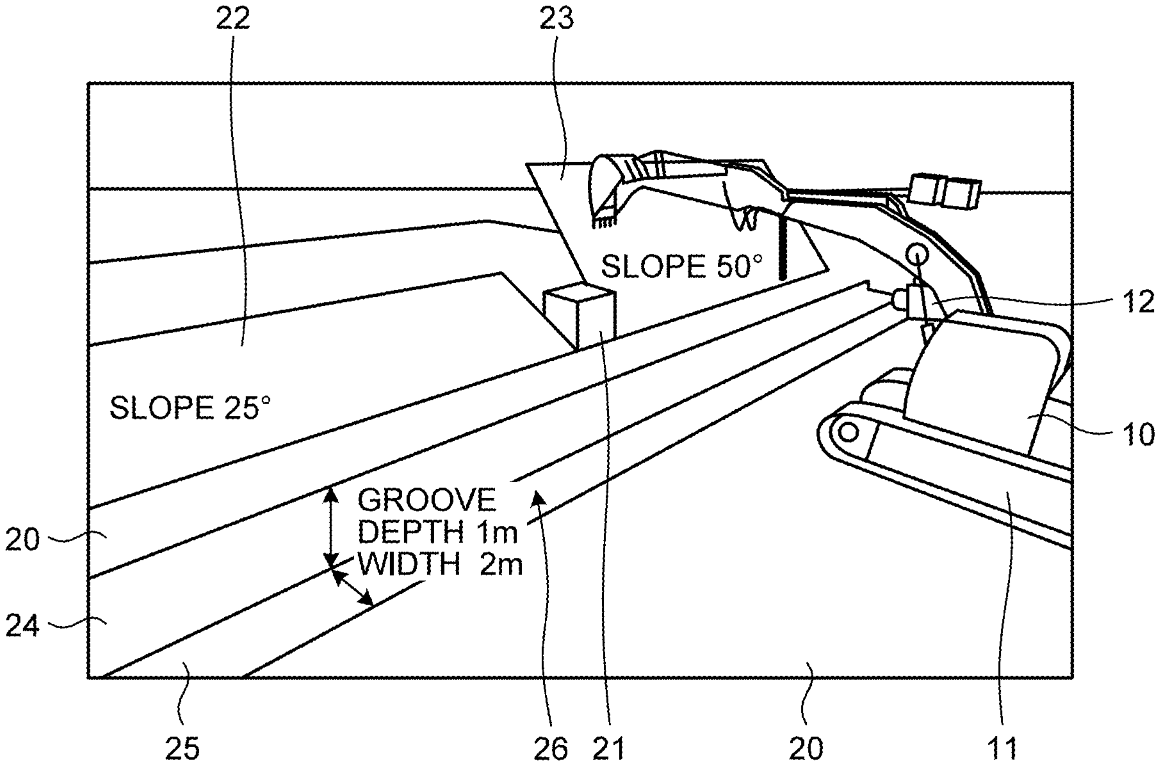
FIG. 1A is a diagram illustrating an example of a traveling path of a work device according to an embodiment of the present disclosure.

Embodiments of the present disclosure are explained in detail below with reference to the drawings. Note that, in the embodiment explained below, redundant explanation is omitted by denoting the same parts with the same reference numerals and signs.

Traveling Path of a Work Device

Figure 1B:
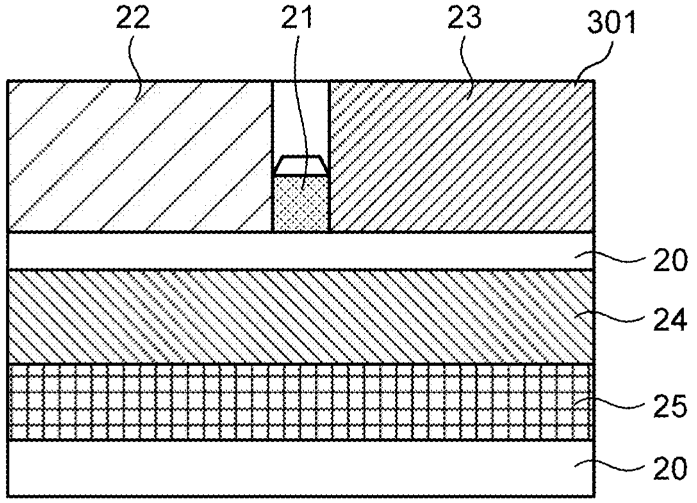
FIG. 1B is a diagram illustrating an example of a traveling path according to the embodiment of the present disclosure.

FIGS. 1A and 1B are diagrams illustrating an example of a traveling path of a work device according to the embodiment of the present disclosure. FIG. 1A is a diagram illustrating an example of a traveling path of a work machine 10. The work machine 10 illustrated in the figure is assumed to be an excavator that travels with a caterpillar 11. The work machine 10 performs work of carrying an object such as earth and sand at a construction site or the like. At the construction site or the like, a traveling obstacle region that is an obstacle to traveling such as a steep hill or a groove formed on the ground is sometimes present. As the traveling obstacle region, an object 21, hills 22 and 23, and a groove 26 are illustrated in the figure. The object 21 is a cube having side surfaces having an angle of 90°. The hill 22 is assumed to be a slope having an angle of 25° and the hill 23 is assumed to be a slope having an angle of 50°. The groove 26 is assumed to be a groove having width of 2 m and depth of 1 m. This groove 26 includes a bottom surface 25 and a slope 24 having an angle of 90°. Note that a ground 20 illustrated in the figure is equivalent to a surface having an angle of 0°.

By detecting such a traveling obstacle region and presenting the traveling obstacle region to a user, it is possible to reduce occurrence of accidents such as a collision and a fall. The traveling obstacle region detection system of the present disclosure detects such a traveling obstacle region. A sensor 12 is disposed in the work machine 10 illustrated in the figure. An image around the work machine 10 is acquired by the sensor 12 and input to the traveling obstacle region detection system. As the sensor 12, for example, a distance measuring sensor that generates a distance image can be used. Here, the distance image is also referred to as depth map and is an image in which distance information is reflected for each pixel.

FIG. 1B is a diagram schematically illustrating an image of the traveling path illustrated in FIG. 1A. In a image 301 illustrated in the figure, a flat ground 20, an object 21, hills 22 and 23, and a slope 24 and a bottom surface 25 of a groove 26 are arranged. An operation of the traveling obstacle region detection system of the present disclosure is explained with reference to the image 301 as an example of a traveling path.

Traveling Obstacle Region Detection System

Figure 2:
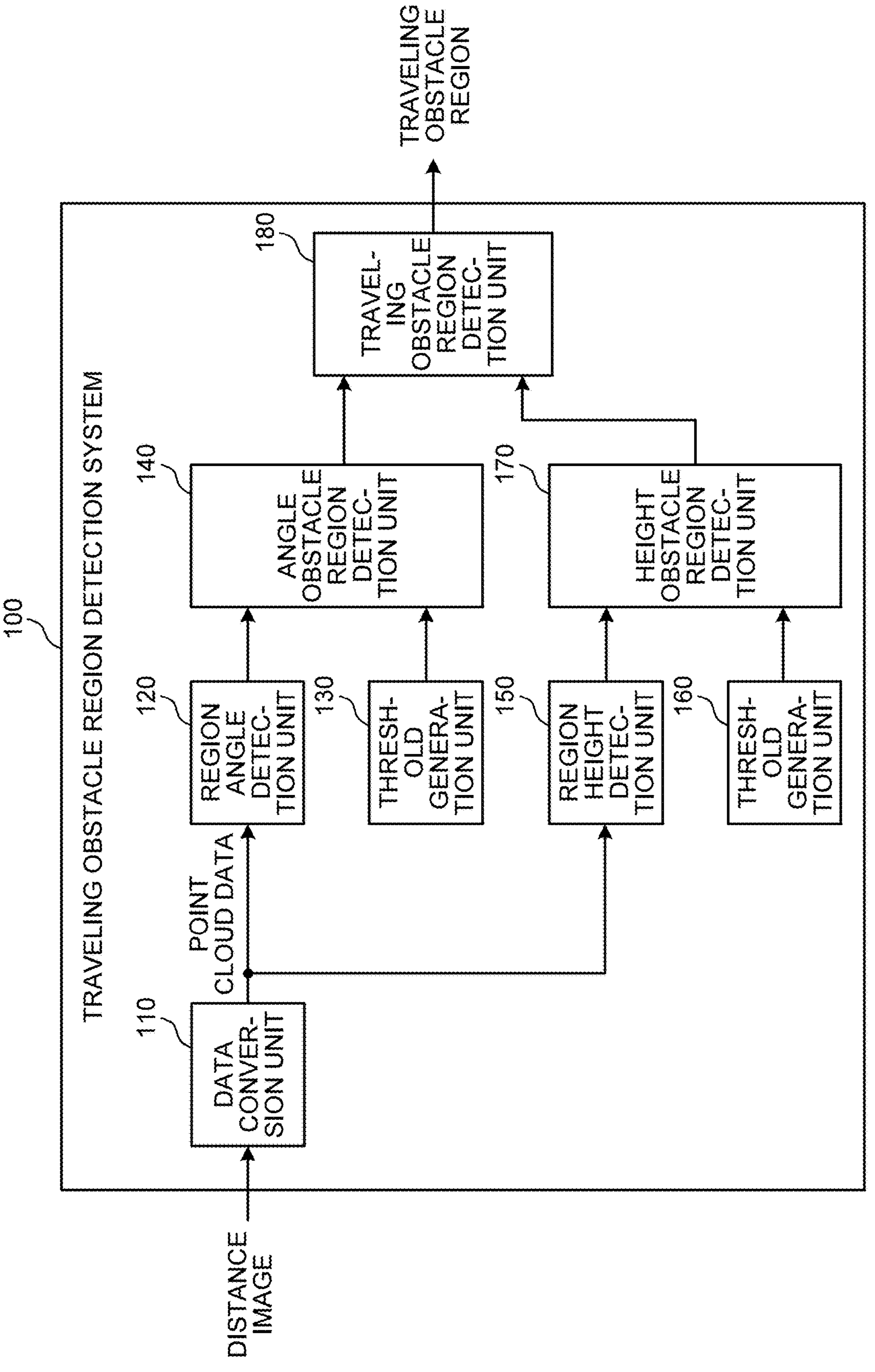
FIG. 2 is a diagram illustrating a configuration example of a traveling obstacle region detection system according to an embodiment of the present disclosure.

FIG. 2 is a diagram illustrating a configuration example of the traveling obstacle region detection system according to the embodiment of the present disclosure. The figure is a block diagram illustrating a configuration example of a traveling obstacle region detection system 100. The traveling obstacle region detection system 100 includes a data conversion unit 110, a region angle detection unit 120, an angle obstacle region detection unit 140, a region height detection unit 150, a height obstacle region detection unit 170, threshold generation units 130 and 160, and a traveling obstacle region detection unit 180.

The data conversion unit 110 converts a distance image, which is input data, into point cloud data. The point cloud data is output to the region angle detection unit 120 and the region height detection unit 150.

The region angle detection unit 120 detects an angle of a traveling surface based on the point cloud data. The detected angle is output to the angle obstacle region detection unit 140.

The angle obstacle region detection unit 140 detects an angle obstacle region that is an obstacle region based on the angle of the traveling surface. The detected angle obstacle region is output to the traveling obstacle region detection unit 180.

The threshold generation unit 130 generates a threshold used for detection of the angle obstacle region in the angle obstacle region detection unit 140.

The region height detection unit 150 detects the height of the traveling surface based on the point cloud data. The detected height is output to the height obstacle region detection unit 170.

The height obstacle region detection unit 170 detects a height obstacle region that is an obstacle region based on the height of the traveling surface. The detected height obstacle region is output to the traveling obstacle region detection unit 180.

The threshold generation unit 160 generates a threshold used for detecting the height obstacle region in the height obstacle region detection unit 170.

The traveling obstacle region detection unit 180 detects a traveling obstacle region based on the angle obstacle region and the height obstacle region. The detected traveling obstacle region is output to an external device, for example, a display device.

In the following explanation, details of processing of the units are explained.

[Data Conversion Processing]

Figure 3:
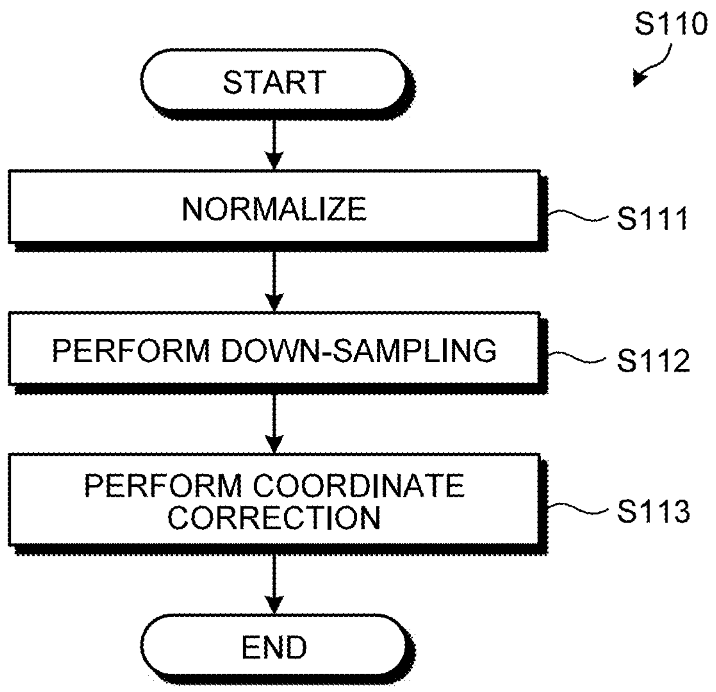
FIG. 3 is a diagram illustrating an example of data conversion processing according to the embodiment of the present disclosure.

FIG. 3 is a diagram illustrating an example of data conversion processing according to the embodiment of the present disclosure. The figure is a flowchart illustrating an example of data conversion processing (S110) in the data conversion unit 110. First, an input distance image is normalized (Step S111). This normalization converts a distance image into point cloud data. The point cloud data is configured by arrays of coordinates of x, y, and z axes of each point. A known method can be applied to the conversion of the distance image into the point cloud data.

Subsequently, down-sampling is performed on the point cloud data (Step S112). This down-sampling is processing for thinning out row and column data for each of the arrays of the coordinates of the x, y, and z axes. By this down-sampling, it is possible to reduce a processing amount and reduce noise.

Subsequently, coordinate correction is performed on the point cloud data after the down-sampling (Step S113). This coordinate correction is processing for converting the point cloud data into global coordinates.

The sensor 12 illustrated in FIG. 1A is attached to a vehicle body of the work machine 10. The point cloud data is corrected according to an attachment height and an attachment angle of the sensor 12.

[Angle Detection Processing]

Figure 4:
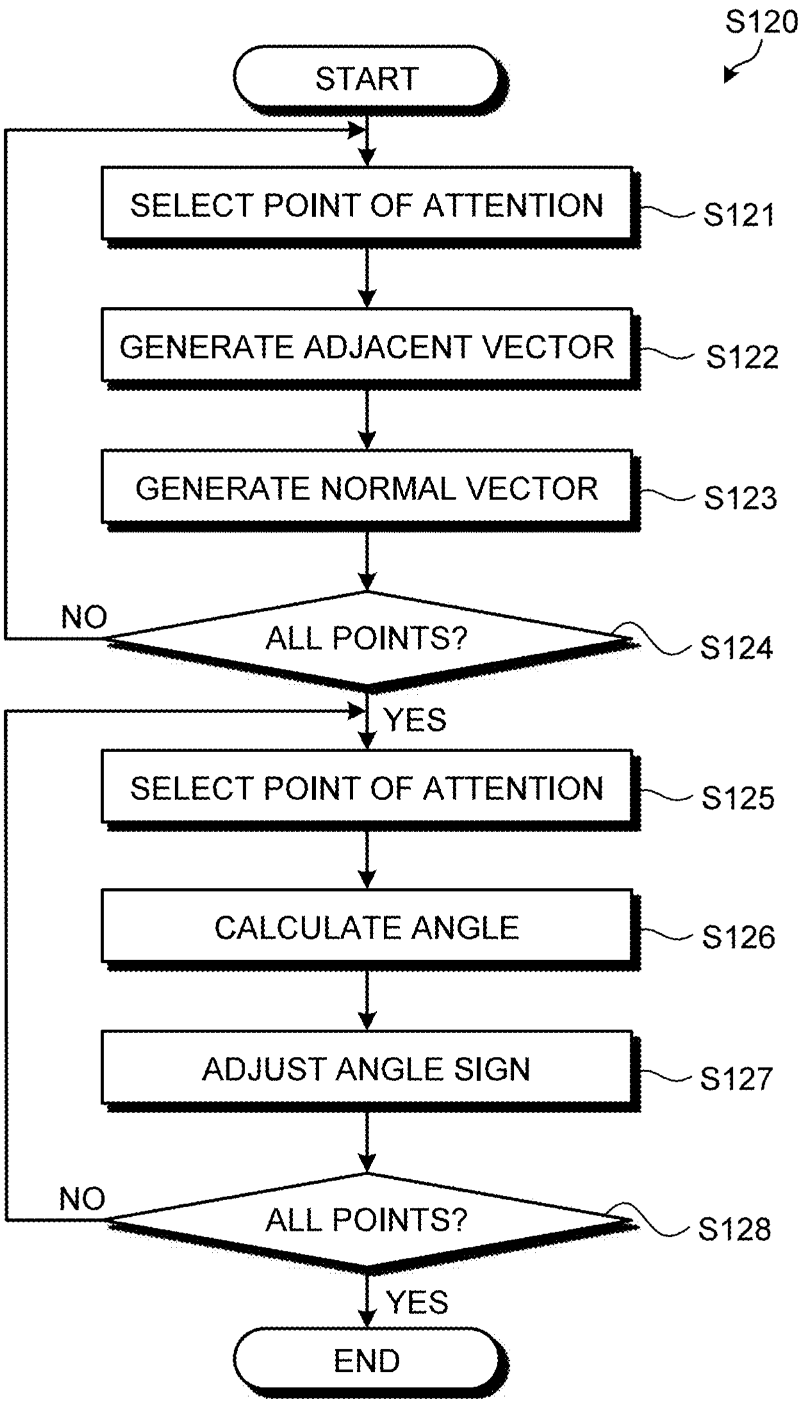
FIG. 4 is a diagram illustrating an example of angle detection processing according to the embodiment of the present disclosure.

FIG. 4 is a diagram illustrating an example of angle detection processing according to the embodiment of the present disclosure. The figure is a flowchart illustrating an example of the angle detection processing (S120) in the region angle detection unit 120. First, the region angle detection unit 120 selects a point of attention of the point cloud data (Step S121). Subsequently, the region angle detection unit 120 generates an adjacent vector for the selected point of attention (Step S122). This is processing for generating a vector directed to two points adjacent in a row direction and a column direction of the point of attention. Subsequently, the region angle detection unit 120 generates a normal vector (Step S123). This can be generated by calculating an outer product of two adjacent vectors. Subsequently, the region angle detection unit 120 determines whether normal vectors have been calculated for all the points (Step S124). The region angle detection unit 120 shifts to Step S125 when the normal vectors have been generated for all the points (Step S124, Yes) and selects another point of attention when there is a point for which a normal vector has not been generated (Step S124, No) (Step S121).

In Step S125, the region angle detection unit 120 selects a point of attention of the point cloud data (Step S125). Subsequently, the region angle detection unit 120 calculates an angle with respect to the selected point of attention (Step S126). This can be performed by calculating an inner product of a normal line and a unit vector in the y-axis direction. Subsequently, the region angle detection unit 120 adjusts an angle sign (Step S127). This is to invert a sign of an angle when a slope angle is a depression angle. This can be performed based on a value of the z-axis array of a point. Specifically, when the value of the z-axis array is a positive value, the sign of the angle is inverted. Subsequently, the region angle detection unit 120 determines whether angles have been calculated for all points (Step S128). The region angle detection unit 120 ends the processing (Step S128, Yes) when the angles have been calculated for all the points and selects another point of attention (Step S128, No) when there is a point for which an angle has not been calculated (Step S125).

[Adjacent Vector Generation Processing]

Figure 5:
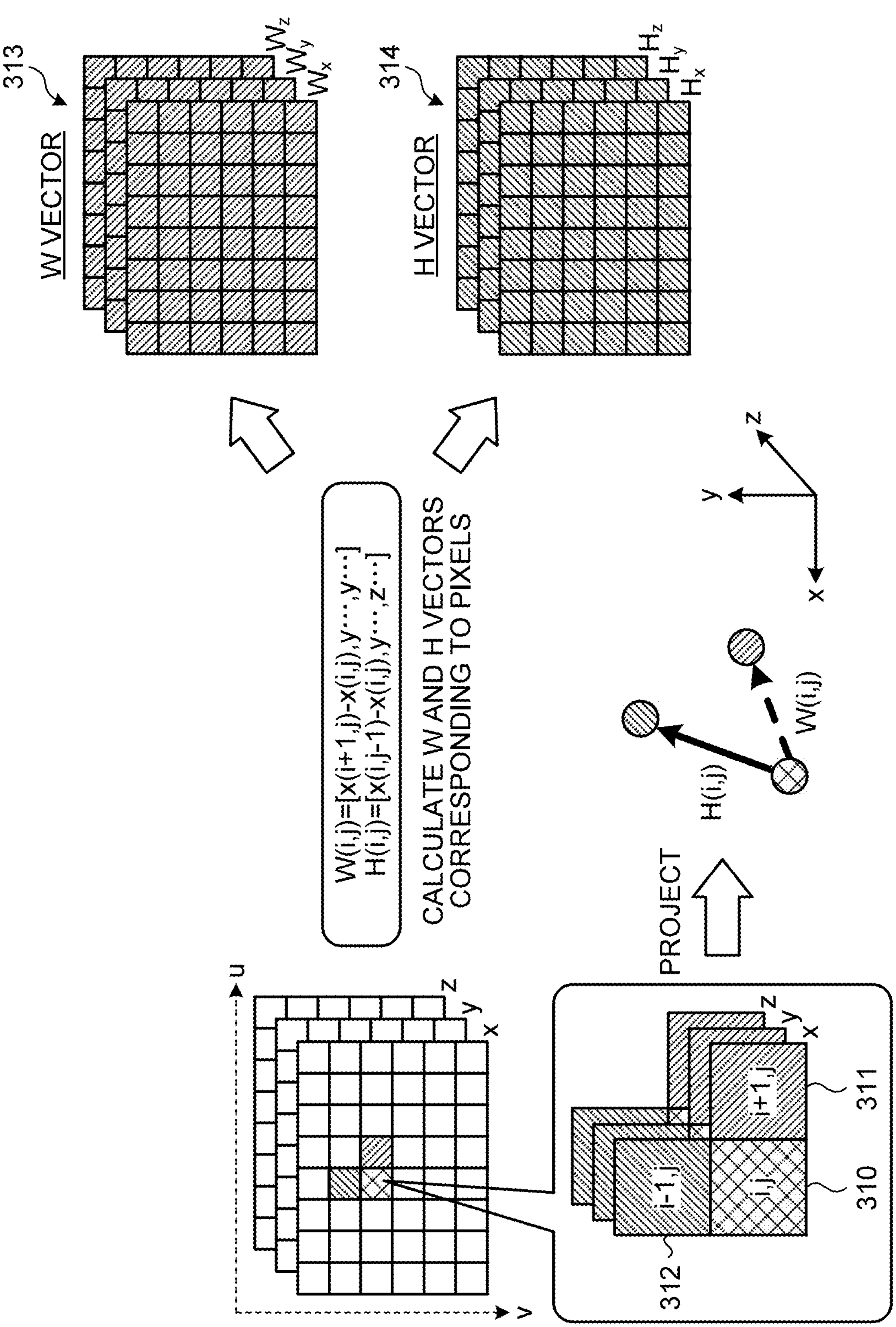
FIG. 5 is a diagram illustrating an example of adjacent vector generation processing according to the embodiment of the present disclosure.

FIG. 5 is a diagram illustrating an example of adjacent vector generation processing according to the embodiment of the present disclosure. In the figure, "x", "y", and "z" respectively represent arrays of coordinates of the x, y, and z axes of the point cloud. Among the arrays, a point of attention 310 is selected and a point 311 adjacent in the row direction and a point 312 adjacent in the column direction of the point of attention 310 are selected. Then, a W vector 313 from the point of attention 310 to the point 311 and an H vector 314 from the point of attention 310 to the point 312 are generated.

[Normal Vector Generation Processing]

Figure 6:
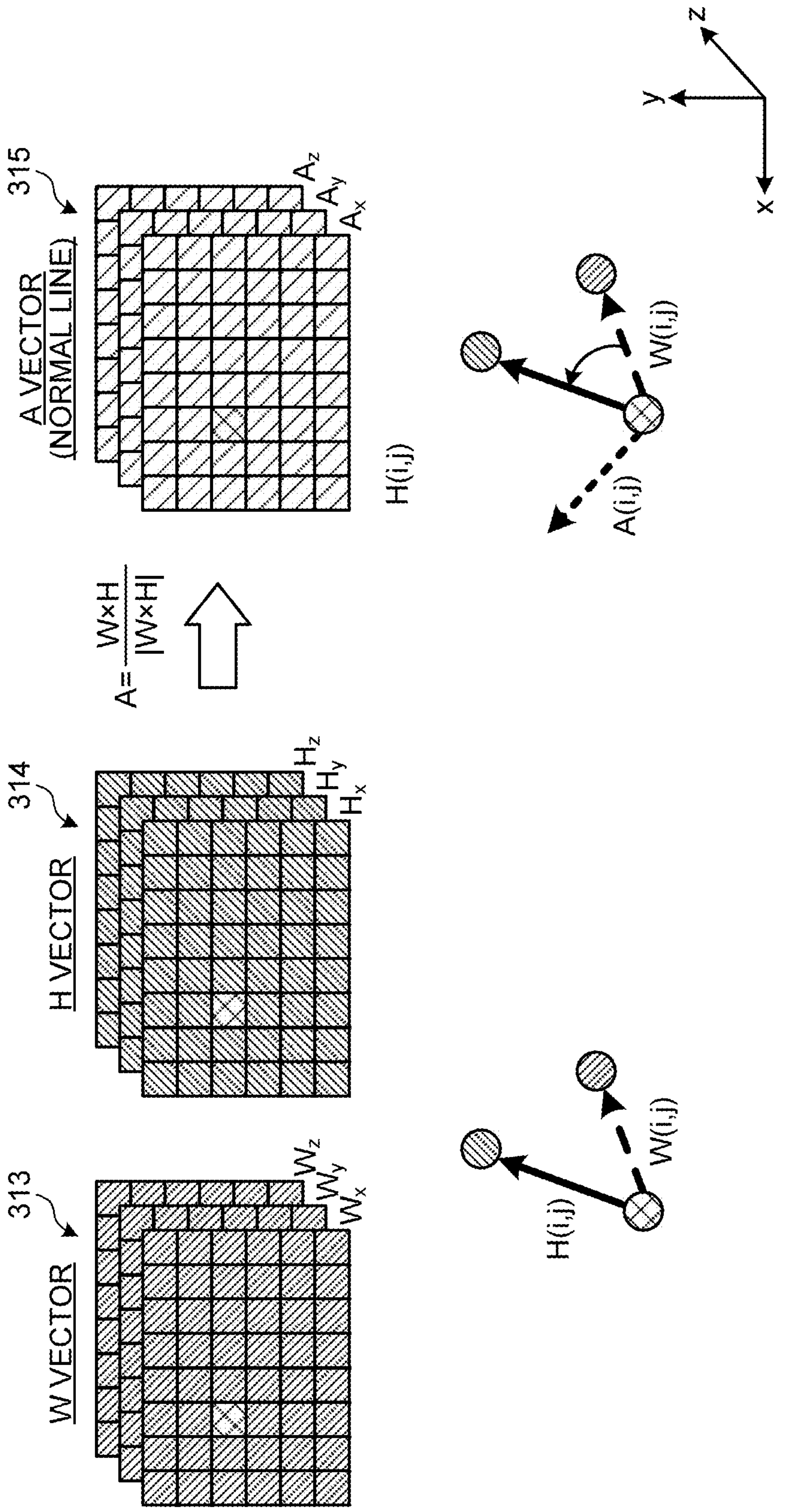
FIG. 6 is a diagram illustrating an example of normal vector generation processing according to the embodiment of the present disclosure.

FIG. 6 is a diagram illustrating an example of normal vector generation processing according to the embodiment of the present disclosure. As illustrated in the figure, a normal vector A can be calculated by calculating an outer product A of a W vector and an H vector and normalizing the outer product A with a norm "1".

[Angle Calculation Processing]

Figure 7:
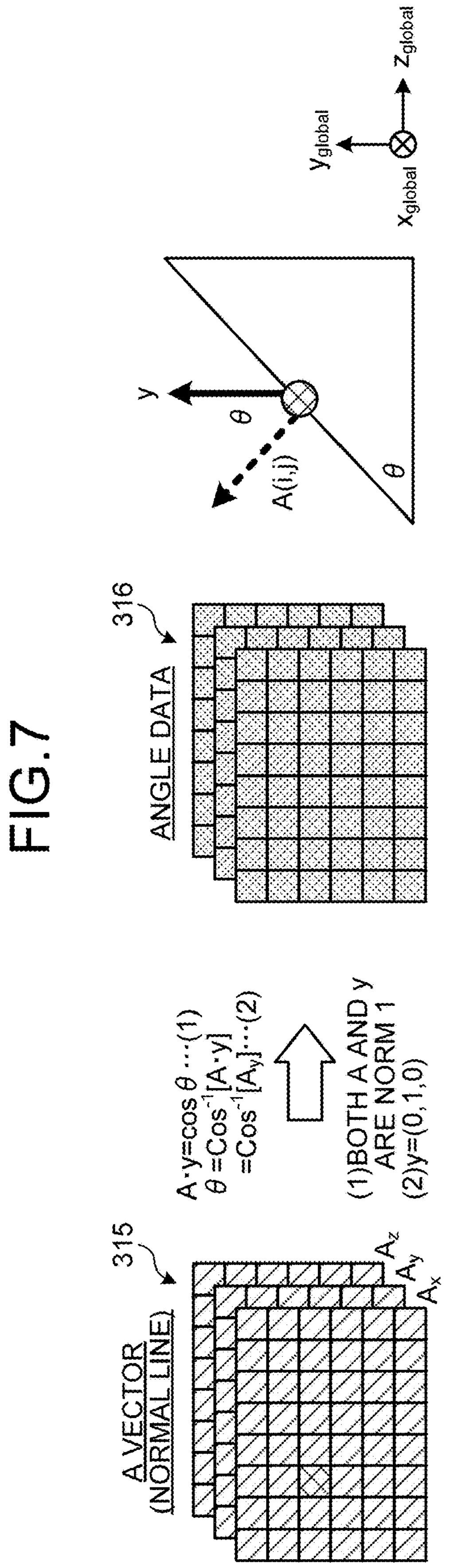
FIG. 7 is a diagram illustrating an example of angle calculation processing according to the embodiment of the present disclosure.

FIG. 7 is a diagram illustrating an example of angle calculation processing according to the embodiment of the present disclosure. As illustrated in the figure, an angle of an inclined surface with respect to the horizontal direction can be calculated by calculating an inner product of the normal vector A and a unit vector "y" in the y-axis direction. The calculated angle is stored in an angle data array.

[Detection Angle]

Figure 8:
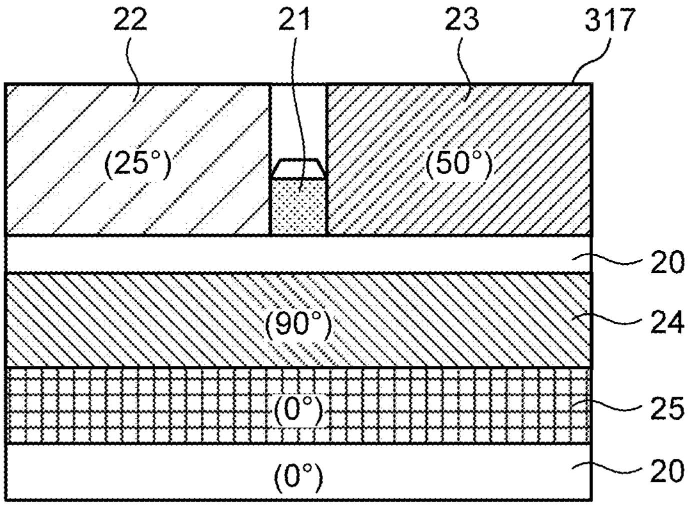
FIG. 8 is a diagram illustrating an example of a detection angle according to the embodiment of the present disclosure.

FIG. 8 is a diagram illustrating an example of a detection angle according to the embodiment of the present disclosure. The figure is a diagram in which an angle detected by the region angle detection unit 120 is superimposed and displayed on the image 301 illustrated in FIG. 1B. In an image 317 illustrated in the figure, angles of 25° and 50° are respectively added to the hills 22 and 23. An angle of 90° is added to a side surface of the object 21 and the slope 24 of the groove 26. 0° is added to regions other than the above.

[Angle Obstacle Region Detection Processing]

Figure 9:
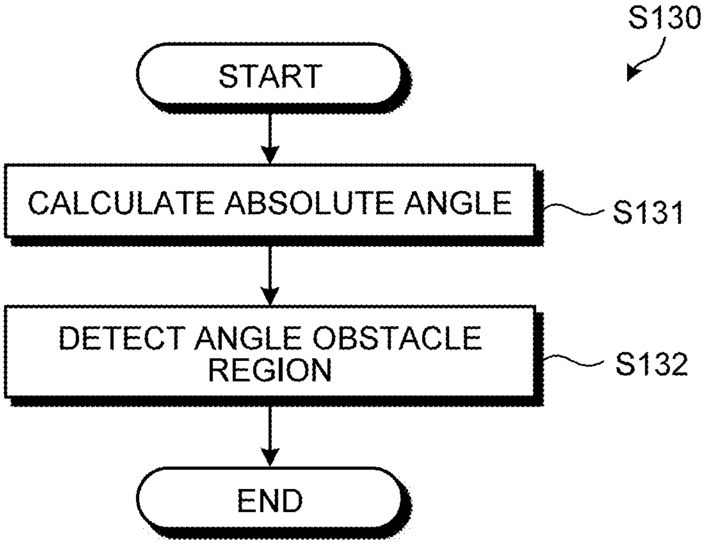
FIG. 9 is a diagram illustrating an example of angle obstacle region detection processing according to the embodiment of the present disclosure.

FIG. 9 is a diagram illustrating an example of angle obstacle region detection processing according to the embodiment of the present disclosure. The figure is a flowchart illustrating an example of angle obstacle region detection processing (S130) in the angle obstacle region detection unit 140. First, the angle obstacle region detection unit 140 calculates an absolute angle (Step S131). This can be performed by correcting an angle based on a tilt of the work machine 10.

Subsequently, the angle obstacle region detection unit 140 detects an angle obstacle region (Step S132). The angle obstacle region detection unit 140 detects the angle obstacle region based on a threshold generated by the threshold generation unit 130. The threshold generation unit 130 can output a predetermined value, for example, 30°, as the threshold. The angle obstacle region detection unit 140 can detect a region having an angle higher than the threshold as the angle obstacle region.

The threshold generation unit 130 can adjust the threshold according to information concerning the work machine 10. For example, the weight, the size, the center of gravity, an angled, a traveling direction (handle information), a speed, and the like of the work machine 10 correspond to the information concerning the work machine 10. In addition, the threshold generation unit 130 can adjust the threshold according to information concerning a surrounding environment. For example, weather, temperature, humidity, the geology of a traveling surface, and the like correspond to the information concerning the surrounding environment. Note that the information concerning the work machine 10 and the information concerning the surrounding environment can be acquired from an external device, for example, a cloud server.

[Angle Obstacle Region]

Figure 10:
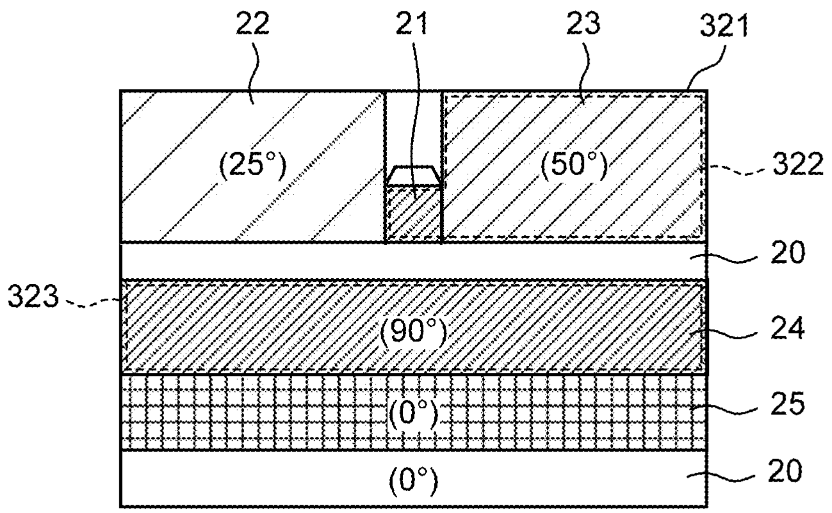
FIG. 10 is a diagram illustrating an example of an angle obstacle region according to the embodiment of the present disclosure.

FIG. 10 is a diagram illustrating an example of an angle obstacle region according to the embodiment of the present disclosure. The figure is a diagram in which the angle obstacle region is superimposed and displayed on the image 317 illustrated in FIG. 8. A region indicated by a dotted line in an image 321 illustrated in the figure corresponds to the angle obstacle region. As illustrated in the figure, an angle obstacle region 322 is added to the hill 23 having an angle of 50° and the side surface of the object 21 having an angle of 90° and an angle obstacle region 323 is added to the slope 24 having an angle of 90°.

[Height Obstacle Region Detection Processing]

Figure 11:
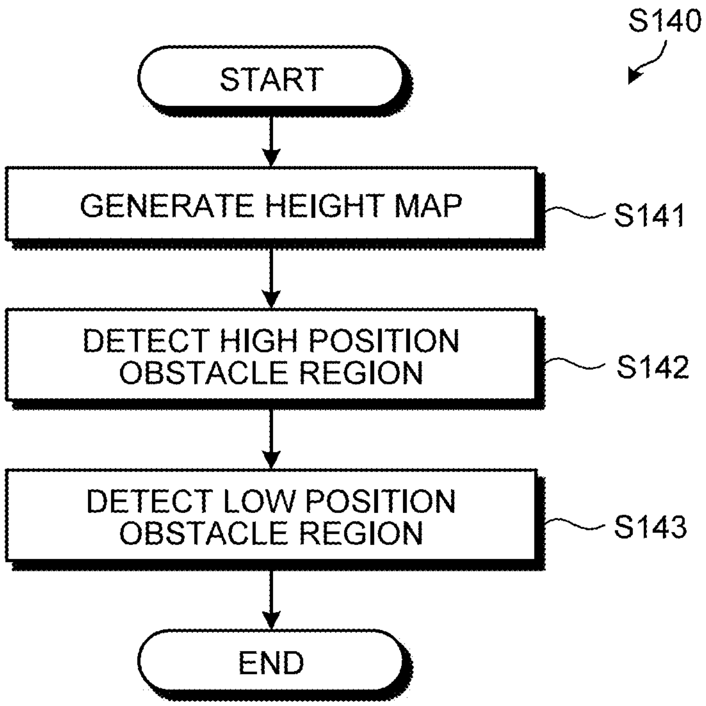
FIG. 11 is a diagram illustrating an example of height obstacle region detection processing according to the embodiment of the present disclosure.

FIG. 11 is a diagram illustrating an example of height obstacle region detection processing according to the embodiment of the present disclosure. The figure is a flowchart illustrating an example of height obstacle region detection processing (S140) in the height obstacle region detection unit 170. Note that the processing illustrated in the figure includes region height detection processing in the region height detection unit 150.

First, the region height detection unit 150 generates a height map (Step S141). This height map is an array representing the height of each region. The array of the coordinates of the y axis explained with reference to FIG. 5 can be applied to the height map.

Subsequently, the height obstacle region detection unit 170 detects a high position obstacle region (Step S142). Specifically, the height obstacle region detection unit 170 detects a region at a position higher than a high position threshold generated by the threshold generation unit 160 as the high position obstacle region. The height obstacle region detection unit 170 detects a low position obstacle region (Step S143). Specifically, the height obstacle region detection unit 170 detects a region at a position lower than a low position threshold generated by the threshold generation unit 160 as the low position obstacle region. The threshold generation unit 130 can output predetermined values, for example, a high position threshold 0.5 m and a low position threshold −0.5 m as the thresholds. As explained above, by separately detecting the high position obstacle region and the low position obstacle region, different kinds of processing can be respectively performed for the high position obstacle region and the low position obstacle region.

Note that the threshold generation unit 160 can adjust the thresholds according to information concerning the work machine 10. For example, the size of the work machine 10 corresponds to the information concerning the work machine 10.

[Height Obstacle Region]

Figure 12:
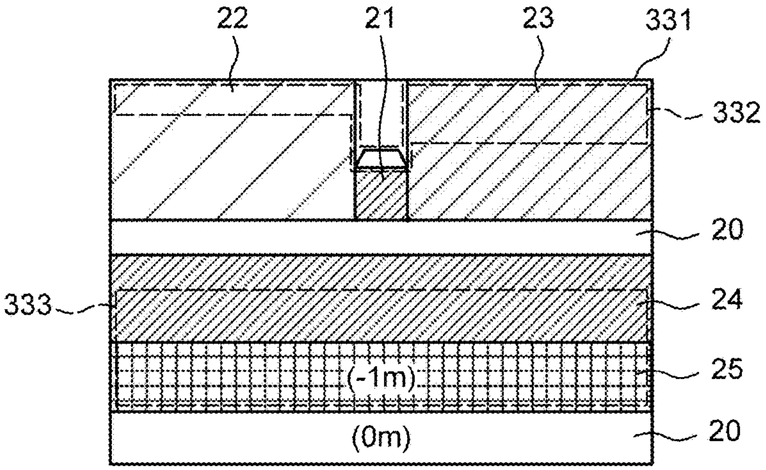
FIG. 12 is a diagram illustrating an example of a height obstacle region according to the embodiment of the present disclosure.

FIG. 12 is a diagram illustrating an example of a height obstacle region according to the embodiment of the present disclosure. The figure is a diagram in which the height obstacle region is superimposed and displayed on the image 317 illustrated in FIG. 8. A region indicated by an alternate long and short dash line in an image 331 in the figure corresponds to a high position obstacle region 332. A region indicated by an alternate long and two short dashes line in the image 331 in the figure corresponds to a low position obstacle region 333. As illustrated in the figure, the high position obstacle region 332 is added to high position regions of the hills 22 and 23 and the upper surface of the object 21. A low position obstacle region 333 is added to a low position region of the slope 24 and the bottom surface 25.

[Traveling Obstacle Region Detection Unit]

Figure 13:
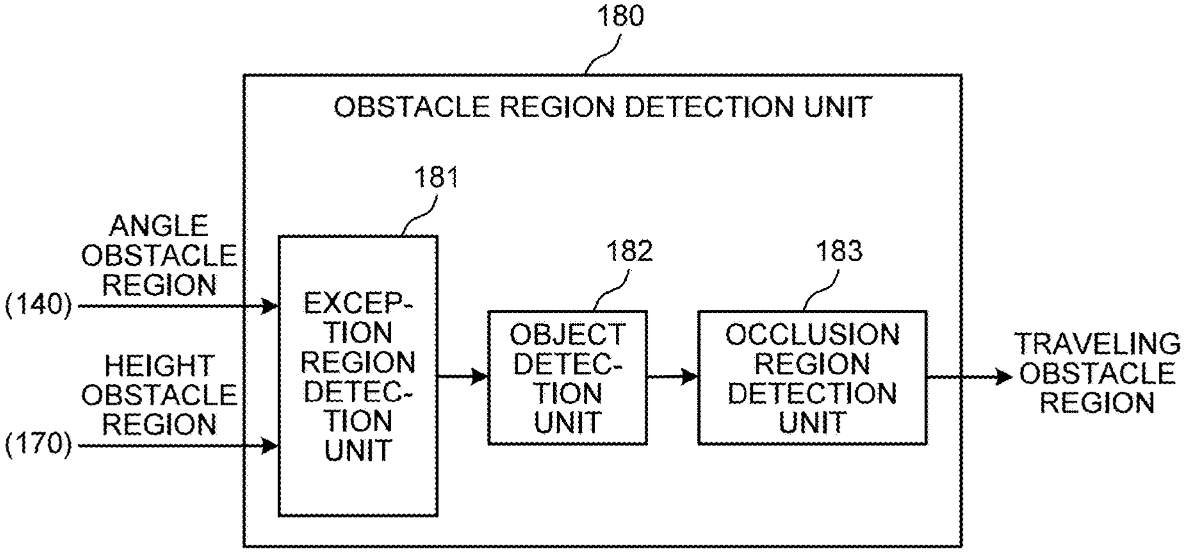
FIG. 13 is a diagram illustrating a configuration example of a traveling obstacle region detection unit according to the embodiment of the present disclosure.

FIG. 13 is a diagram illustrating a configuration example of the traveling obstacle region detection unit according to the embodiment of the present disclosure. The figure is a block diagram illustrating a configuration example of the traveling obstacle region detection unit 180. The traveling obstacle region detection unit 180 includes an exception region detection unit 181, an object detection unit 182, and an occlusion region detection unit 183.

The exception region detection unit 181 detects an exception region of the angle obstacle region and the height obstacle region. The angle obstacle region and the height obstacle region other than the exception region detected by the exception region detection unit 181 are traveling obstacle regions.

The object detection unit 182 detects an object placed on a traveling surface. The object detection unit 182 detects an object that obstructs traveling such as a person or another work machine 10.

The occlusion region detection unit 183 detects an occlusion region. This occlusion region is a region where an angle and height on the traveling surface cannot be detected. For example, a region hidden by a cliff or the like corresponds to the occlusion region. By detecting this occlusion region as an obstacle region, it is possible to improve the safety of the work machine 10.

[Traveling Obstacle Region Detection Processing]

Figure 14:
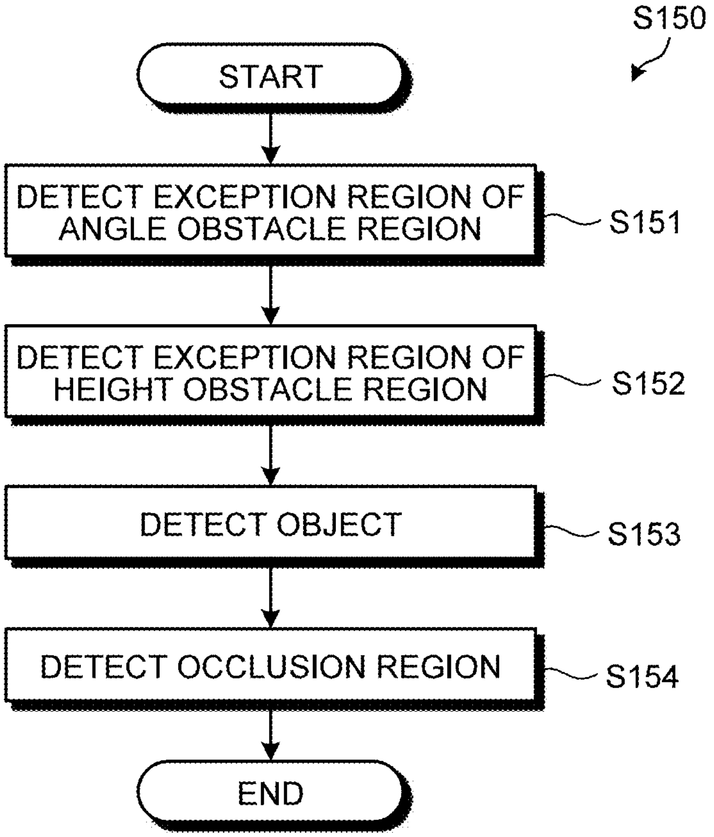
FIG. 14 is a diagram illustrating an example of traveling obstacle region detection processing according to the embodiment of the present disclosure.

FIG. 14 is a diagram illustrating an example of traveling obstacle region detection processing according to the embodiment of the present disclosure. The figure is a block diagram illustrating an example of processing in the traveling obstacle region detection unit 180. First, the exception region detection unit 181 detects an exception region of an angle obstacle region (Step S151). For example, a region of a hill having a height lower than a predetermined threshold corresponds to this exception region. This is because, even in a slope having a steep angle, a region having a height lower than the height of the caterpillar 11 of the work machine 10 can be climbed over. The detected exception region is excluded from the angle obstacle region.

Subsequently, the exception region detection unit 181 detects an exception region of a height obstacle region (Step S152). For example, a region having width smaller than a predetermined threshold corresponds to the exception region. This is because the groove 26 or the like having relatively narrow width can be climbed over. The detected exception region is excluded from the height obstacle region.

Subsequently, the object detection unit 182 detects an object (Step S153). A region of the detected object is added to the traveling obstacle region.

Subsequently, the occlusion region detection unit 183 detects an occlusion region (Step S154). The detected occlusion region is added to the traveling obstacle region.

[Occlusion Region]

Figure 15:
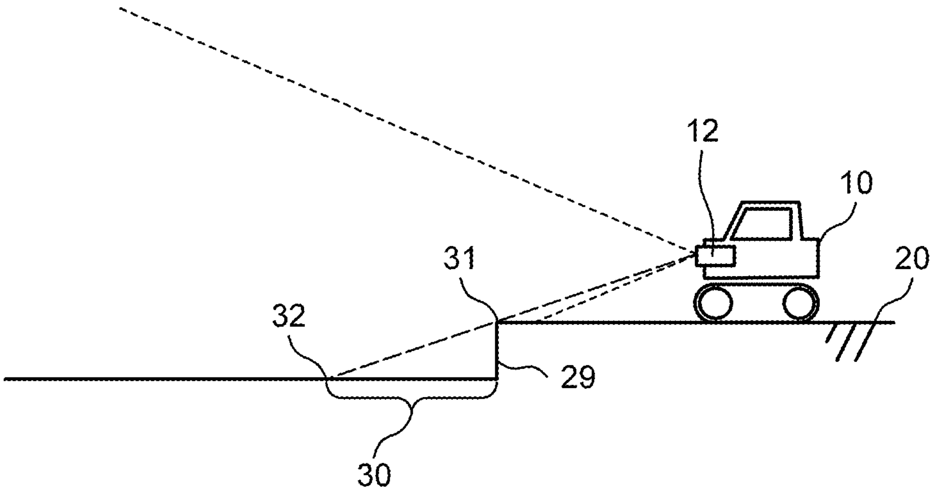
FIG. 15 is a diagram illustrating an example of an occlusion region according to the embodiment of the present disclosure.

FIG. 15 is a diagram illustrating an example of an occlusion region according to the embodiment of the present disclosure. The figure is a diagram illustrating a state in which a distance image of a traveling surface is detected by the sensor 12 of the work machine 10. A dotted line in the figure represents the field of view of the sensor 12. A step 29 is present on the ground 20 illustrated in the figure. A region hidden by the cliff 31 in the upper part of the step 29 viewed from the sensor 12 is an occlusion region 30. An alternate long and short dash line in the figure is a line connecting the sensor 12 and the cliff 31. Assuming that this alternate long and short dash line is a position 32 intersecting the ground 20 below the cliff 31, a portion where the distance from the cliff 31 to the position 32 is discontinuous is generated in a distance image. The occlusion region detection unit 183 can detect a region where this distance is discontinuous as the occlusion region 30.

[Traveling Obstacle Detection Processing]

Figure 16:
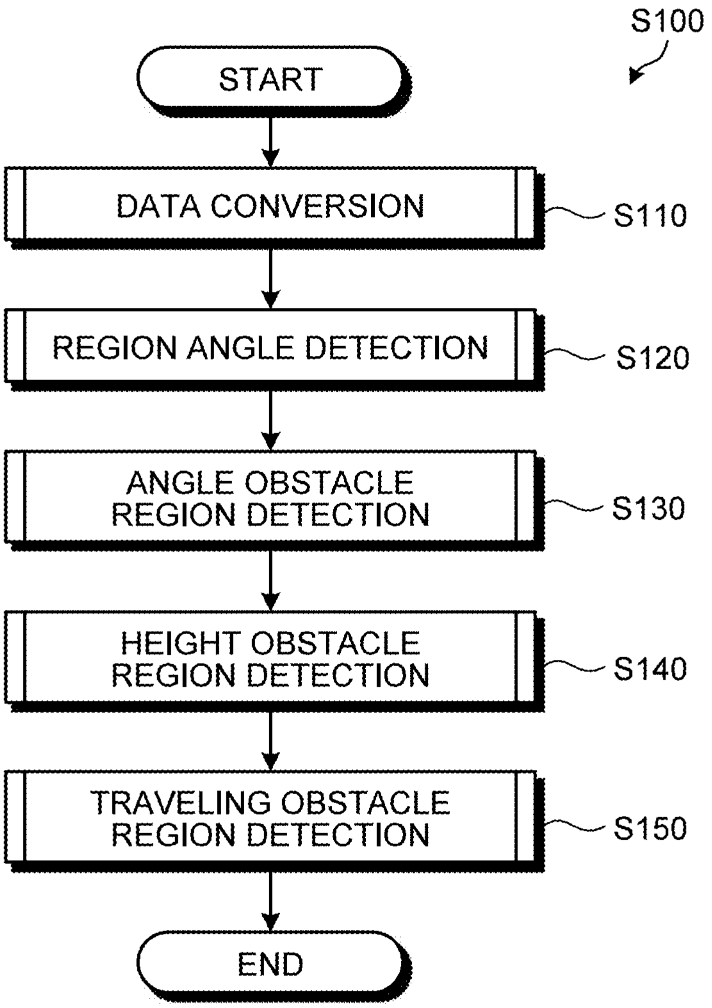
FIG. 16 is a diagram illustrating an example of traveling obstacle region detection processing according to the embodiment of the present disclosure.

FIG. 16 is a diagram illustrating an example of traveling obstacle region detection processing according to the embodiment of the present disclosure. The figure is a flowchart illustrating an example of processing in the traveling obstacle region detection system 100. First, the data conversion unit 110 performs data conversion processing (Step S110). Subsequently, the region angle detection unit 120 performs region angle detection processing (Step S120). Subsequently, the angle obstacle region detection unit 140 performs angle obstacle region detection processing (Step S130). Subsequently, the region height detection unit 150 and the height obstacle region detection unit 170 perform height obstacle region detection processing (Step S140). Subsequently, the traveling obstacle region detection unit 180 performs traveling obstacle region detection processing (Step S150). A traveling obstacle region can be detected by the processing explained above. The detected traveling obstacle region is output to an external device.

As explained above, the traveling obstacle region detection system 100 of the present disclosure detects the traveling obstacle region based on the angle and the height of the traveling surface. Therefore, it is possible to improve the ability of detecting an obstacle region.

Note that the traveling obstacle region detection system 100 of the present disclosure can be applied to, for example, a general vehicle, a construction machine, an agricultural machine, a forestry machine, a disaster rescue machine, a home machine for nursing care and cleaning, a seabed probe, and a planet probe besides a work device at a construction site.

Other Modifications

The traveling obstacle region detection system 100 in the present embodiment may be implemented by a dedicated computer system or may be implemented by a general-purpose computer system.

For example, a program for executing the operation explained above is stored in a computer-readable recording medium such as an optical disk, a semiconductor memory, a magnetic tape, or a flexible disk and distributed. Then, for example, the control device is configured by installing the program in a computer and executing the processing explained above.

The communication program explained above may be stored in a disk device included in a server device on a network such as the Internet to make it possible to download the communication program to a computer. The functions explained above may be implemented by cooperation of an OS (Operating System) and application software. In this case, a portion other than the OS may be stored in a medium and distributed or the portion other than the OS may be stored in the server device to make it possible to download the portion to the computer.

Among the kinds of processing explained in the embodiment, all or a part of the processing explained as being automatically performed can be manually performed or all or a part of the processing explained as being manually performed can be automatically performed by a publicly-known method. Besides, the processing procedures, the specific names, and the information including the various data and parameters explained in the document and illustrated in the figures can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be functionally or physically distributed and integrated in any unit according to various loads, usage situations, and the like. Note that this configuration by the distribution and the integration may be dynamically performed.

The embodiments explained above can be combined as appropriate in a range for not causing processing contents to contradict one another. The order of the steps illustrated the flowchart in the embodiment explained above can be changed as appropriate.

For example, the present embodiments can be implemented as any component configuring a device or a system, for example, a processor functioning as a system LSI (Large Scale Integration) or the like, a module that uses a plurality of processors or the like, a unit that uses a plurality of modules or the like, or a set obtained by further adding other functions to the unit (that is, a component as a part of the device).

Note that, in the present embodiments, the system means a set of a plurality of components (devices, modules (components), and the like). It does not matter whether all the components are present in the same housing. Therefore, both of a plurality of devices housed in separate housings and connected via a network and one device in which a plurality of modules is housed in one housing are systems.

For example, the present embodiment can adopt a configuration of cloud computing in which one function is shared and processed by a plurality of devices in cooperation via a network.

Although the embodiments of the present disclosure are explained above, the technical scope of the present disclosure is not limited to the embodiments per se. Various changes can be made without departing from the gist of the present disclosure. Components in different embodiments and modifications may be combined as appropriate.

The processing procedure explained in the embodiments may be regarded as a method including these series of procedures and may be regarded as a program for causing a computer to execute these series of procedures or a recording medium storing the program. As this recording medium, for example, a flexible disk, a CD-ROM (Compact Disc Read Only Memory), an MO (Magnet optical) disk, a DVD (Digital Versatile Disc), a Blu-ray (registered trademark) disc, a magnetic disk, a semiconductor memory, a memory card, and the like can be used.

Note that the effects described in this specification are only illustrations and are not limited. Other effects may be present.

Note that this technology can also take the following configurations.

(1) A system that detects a traveling obstacle region that is a region that obstructs traveling of a work machine, the system comprising:
- a region angle detection unit that detects an angle of a traveling surface based on a distance image around the work machine;
- a region height detection unit that detects a height of the traveling surface based on the distance image;
- an angle obstacle region detection unit that detects an angle obstacle region that is an obstacle region based on the detected angle;
- a height obstacle region detection unit that detects a height obstacle region that is an obstacle region based on the detected height; and
- a traveling obstacle region detection unit that detects the traveling obstacle region based on the detected angle obstacle region and the detected height obstacle region.

(2) The system according to the above (1), wherein the angle obstacle region detection unit detects the angle obstacle region based on a threshold of the angle.

(3) The system according to the above (2), wherein the angle obstacle region detection unit detects the angle obstacle region based on the threshold adjusted according to information concerning the work machine.

(4) The system according to the above (2), wherein the angle obstacle region detection unit detects the angle obstacle region based on the threshold adjusted according to information concerning a surrounding environment.

(5) The system according to any one of the above (1) to (4), wherein the height obstacle region detection unit detects the height obstacle region based on a threshold of the height.

(6) The system according to any one of the above (1) to (5), wherein the traveling obstacle region detection unit detects the traveling obstacle region by excluding a region having a predetermined height in the detected angle obstacle region.

(7) The system according to any one of the above (1) to (6), wherein the traveling obstacle region detection unit detects the traveling obstacle region by excluding a region having a predetermined width in the detected height obstacle region.

(8) The system according to any one of the above (1) to (7), further comprising an object detection unit that detects an object placed on the traveling surface, wherein the traveling obstacle region detection unit further detects a region of the detected object as the traveling obstacle region.

(9) The system according to any one of the above (1) to (8), further comprising an occlusion region detection unit that detects an occlusion region that is a region where the angle and the height on the traveling surface cannot be detected, wherein the traveling obstacle region detection unit further detects the detected occlusion region as the traveling obstacle region.

(10) A program for detecting a traveling obstacle region that is a region that obstructs traveling of a work machine, the program comprising:

a region angle detection procedure of detecting an angle of a traveling surface based on a distance image around the work machine;

a region height detection procedure of detecting height of the traveling surface based on the distance image;

an angle obstacle region detection procedure of detecting an angle obstacle region that is an obstacle region based on the detected angle;

a height obstacle region detection procedure of detecting a height obstacle region that is an obstacle region based on the detected height; and a traveling obstacle region detection procedure of detecting the traveling obstacle region based on the detected angle obstacle region and the detected height obstacle region.

REFERENCE SIGNS LIST

10 WORK MACHINE
12 SENSOR
100 TRAVELING OBSTACLE REGION DETECTION SYSTEM
110 DATA CONVERSION UNIT
120 REGION ANGLE DETECTION UNIT
130 THRESHOLD GENERATION UNIT
140 ANGLE OBSTACLE REGION DETECTION UNIT
150 REGION HEIGHT DETECTION UNIT
160 THRESHOLD GENERATION UNIT
170 HEIGHT OBSTACLE REGION DETECTION UNIT
180 TRAVELING OBSTACLE REGION DETECTION UNIT
181 EXCEPTION REGION DETECTION UNIT
182 OBJECT DETECTION UNIT
183 OCCLUSION REGION DETECTION UNIT

The invention claimed is:

1. A system that detects a traveling obstacle region that is a region that obstructs traveling of a work machine, the system comprising:

processing circuitry configured to detect an angle of a traveling surface based on a distance image around the work machine;

detect a height of the traveling surface based on the distance image;

detect an angle obstacle region that is an obstacle region based on the detected angle;

detect a height obstacle region that is an obstacle region based on the detected height;

detect a traveling obstacle region based on the detected angle obstacle region and the detected height obstacle region, wherein the processing circuitry is further configured to detect the traveling obstacle region by excluding a region having a predetermined height in the detected angle obstacle region and by excluding a region having a predetermined width in the detected height obstacle region; and output the detected traveling obstacle region to an external device, the detected traveling obstacle region being a region that obstructs traveling of the work machine; and control the work machine based on the detected traveling obstacle region.

2. The system according to claim 1, wherein the processing circuitry is further configured to detect the angle obstacle region based on a threshold of the angle.

3. The system according to claim 2, wherein processing circuitry is further configured to detect the angle obstacle region based on the threshold adjusted according to information concerning the work machine.

4. The system according to claim 2, wherein processing circuitry is further configured to detect the angle obstacle region based on the threshold adjusted according to information concerning a surrounding environment.

5. The system according to claim 1, wherein the processing circuitry is further configured to detect the height obstacle region based on a threshold of the height.

6. The system according to claim 1, wherein the processing circuitry is further configured to detect an object placed on the traveling surface, and detect a region of the detected object as the traveling obstacle region.

7. The system according to claim 1, wherein the processing circuitry is further configured to detect an occlusion region that is a region where the angle and the height on the traveling surface cannot be detected, and detect the detected occlusion region as the traveling obstacle region.

8. A non-transitory computer-readable storage medium storing computer-readable instructions for detecting a traveling obstacle region that is a region that obstructs traveling of a work machine thereon which, when executed by a computer, cause the computer to perform a method, the method comprising:

detecting an angle of a traveling surface based on a distance image around the work machine;
detecting height of the traveling surface based on the distance image;
detecting an angle obstacle region that is an obstacle region based on the detected angle;
detecting a height obstacle region that is an obstacle region based on the detected height; and
detecting the traveling obstacle region based on the detected angle obstacle region and the detected height obstacle region;
wherein the detected traveling obstacle region, excluding a region having a predetermined height in the detected angle obstacle region and excluding a region having a predetermined width in the detected height obstacle region; and
outputting the detected traveling obstacle region to an external device, the detected traveling obstacle region being a region that obstructs traveling of the work machine; and
controlling the work machine based on the detected traveling obstacle region.

* * * * *